United States Patent
Inagaki et al.

(10) Patent No.: US 8,488,187 B2
(45) Date of Patent: Jul. 16, 2013

(54) IMAGE FORMING APPARATUS AND METHOD FOR FORMING IMAGE

(75) Inventors: Tsutomu Inagaki, Ise (JP); Takayuki Toba, Ise (JP); Jun Ichii, Ise (JP); Shinya Orimo, Ise (JP); Yoshikazu Hirai, Ise (JP)

(73) Assignee: Shinko Electric Co., Ltd., Tokyo (JP)

( * ) Notice: Subject to any disclaimer, the term of this patent is extended or adjusted under 35 U.S.C. 154(b) by 780 days.

(21) Appl. No.: 12/099,615

(22) Filed: Apr. 8, 2008

(65) Prior Publication Data

US 2009/0040539 A1 Feb. 12, 2009

(30) Foreign Application Priority Data

Apr. 9, 2007 (JP) ................................. 2007-102087
May 25, 2007 (JP) ................................. 2007-138649

(51) Int. Cl.
*H04N 1/60* (2006.01)
*G06K 15/00* (2006.01)

(52) U.S. Cl.
USPC ........... 358/1.9; 358/2.1; 358/3.27; 358/3.06; 358/1.16; 358/1.17; 347/106; 347/20; 400/120.02

(58) Field of Classification Search
USPC ............... 358/1.9, 1.12; 400/120.02; 347/106
See application file for complete search history.

(56) References Cited

U.S. PATENT DOCUMENTS

| | | | | |
|---|---|---|---|---|
| 5,239,348 A | * | 8/1993 | Fukuchi et al. | ................. 399/45 |
| 5,589,869 A | | 12/1996 | Brandt et al. | |
| 6,092,942 A | * | 7/2000 | Koichi et al. | ............ 400/120.02 |

FOREIGN PATENT DOCUMENTS

| | | |
|---|---|---|
| EP | 0 481 091 A1 | 4/1992 |
| EP | 0 988 982 A2 | 3/2000 |
| GB | 2 317 367 A | 3/1998 |
| JP | 2006-15699 | 1/2006 |
| JP | 3861293 | 10/2006 |

OTHER PUBLICATIONS

Japanese Office Action issued Feb. 28, 2012, in Patent Application No. 2007-138649 (with English-language Translation).

* cited by examiner

*Primary Examiner* — Steven Kau
*Assistant Examiner* — Quang N Vo
(74) *Attorney, Agent, or Firm* — Oblon, Spivak, McClelland, Maier & Neustadt, L.L.P.

(57) ABSTRACT

Data concerning a transfer pattern of a lamination transparent film is not externally sent and stored in a memory but is generated by a random pattern generating module of a color controlling DSP. A random number generating section generates a pseudorandom number for each dot of one line; a tone data obtaining section obtains tone data corresponding to the pseudorandom number; and a transferring section transfers the tone data to a head signal converting ASIC. Tone data for each dot of one line is alternately written in line buffers. Using the tone data written in the line buffers, a thermal head transfers transparent film.

6 Claims, 6 Drawing Sheets

IMAGE FORMING APPARATUS AND METHOD FOR FORMING IMAGE

BACKGROUND OF THE INVENTION

1. Field of the Invention

The present invention relates to an image forming apparatus and an image forming method, in particular, using a laminate technique.

2. Description of Related Art

As one of image forming apparatuses, a sublimation type thermal transfer printer is known in which color inks of yellow, magenta, and cyan are made to sublimate by heat of a thermal head to form a color image on a recording medium. On the other hand, laminate techniques are known in which the surface of a recording medium on which an image has been formed is coated with a transparent film in order to protect the image formed on the recording medium against moisture and oil to keep the quality of the image for a long time. Such techniques are categorized into gloss finish in which a transparent film is transferred to the whole surface in an even pattern; and matte finish in which a transparent film is transferred to the whole surface in an uneven pattern. For example, Japanese Patent No. 3861293 discloses a technique concerning matte finish.

In Japanese Patent No. 3861293, uneven pattern data for the transparent film is sent from a host computer to a printer, and stored in a laminate memory provided in the printer. The pattern data to be stored in the laminate memory is not for the whole surface of the recording medium but partial data. The pattern based on the partial data is repeated in a sub scanning direction to form an uneven pattern on the whole surface.

SUMMARY OF THE INVENTION

In the technique of Japanese Patent No. 3861293, because the laminate memory stores therein not data for the whole surface of the recording medium but partial pattern data as described above, the capacity of the memory can be reduced in comparison with the case of storing the data for the whole surface. However, although the capacity can be reduced, a dedicated memory for storing pattern data for transparent film lamination must be provided in the printer. There is a problem that the cost can not be reduced due to the provision of the memory.

An object of the present invention is to provide an image forming apparatus and an image forming method, wherein there is no necessity of providing a dedicated memory for storing pattern data for transparent film lamination.

An image forming apparatus according to the present invention comprises a conveyance mechanism that conveys a recording medium; a recording head that records an image in accordance with image data on the recording medium being conveyed by the conveyance mechanism, and transfers a transparent film on the recording medium on which the image has been recorded; a data generating unit that generates data concerning a transfer pattern of the transparent film; and a controller that controls the recording head so that the transparent film is transferred on the basis of the data generated in the data generating unit.

An image forming method according to the present invention in which an image is recorded on a recording medium in accordance with image data and a transparent film is transferred onto the recording medium on which the image has been recorded, comprises a data generating step of generating data concerning a transfer pattern of the transparent film; and a controlling step of controlling the recording head so that the transparent film is transferred on the basis of the data generated in the data generating step.

According to the above features, the data concerning the transfer pattern of a transparent film is not externally sent and stored in a memory but generated in the data generating unit. Therefore, there is no necessity of providing a dedicated memory for storing the data, which is advantageous in cost.

The data generating unit preferably repeatedly generates data concerning a partial transfer pattern of the transparent film to be transferred onto the whole surface of the recording medium.

In addition, preferably in the data generating step, data concerning a partial transfer pattern of the transparent film to be transferred onto the whole surface of the recording medium is repeatedly generated.

According to the above features, because the data concerning only a partial transfer pattern is repeatedly generated, the generating process of the transfer pattern data can be simplified and the time for the process can be shortened.

The data generating unit preferably repeatedly generates data of one line.

In addition, preferably in the data generating step, data of one line is repeatedly generated.

According to the above features, a simple construction can be realized with the use of a line buffer for storing data of one line.

A color controlling unit that controls colors of the image to be recorded on the recording medium preferably has the function of the data generating unit.

According to the above feature, because the color controlling unit to be used in image recording in accordance with image data can be used for lamination, there is no necessity of adding a new component.

The data generating unit may include an image processing unit, and the data concerning the transfer pattern generated by the data generating unit may be processed by the image processing unit. In addition, the data generating step may include an image processing step, and the data concerning the transfer pattern generated in the data generating step may be processed in the image processing step.

According to the above features, because the data concerning the transfer pattern can be image-processed, a wide variety of mat prints can be realized. For example, when the data concerning the transfer pattern is random pattern data, the change in the unevenness of the random pattern can be made smooth; or a mat print having a three-dimensional appearance (a feeling of roughness) can be made by enhancing the difference in the unevenness. The image process may be any known process such as embossment or edge enhancement. Concretely, it is made by means such as an MTF filter or an unsharp mask.

The recording head may be a thermal head that transfers inks carried on an ink ribbon to record an image on the recording medium, and transfers a transparent film carried on the ink ribbon subsequently to the inks onto the recording medium on which the image has been formed with the inks.

The problem that a dedicated memory must be provided for storing pattern data for transparent film lamination is particularly remarkable in a thermal transfer type image forming apparatus. According to the above feature, therefore, because the problem is dissolved, a more practical effect is obtained.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
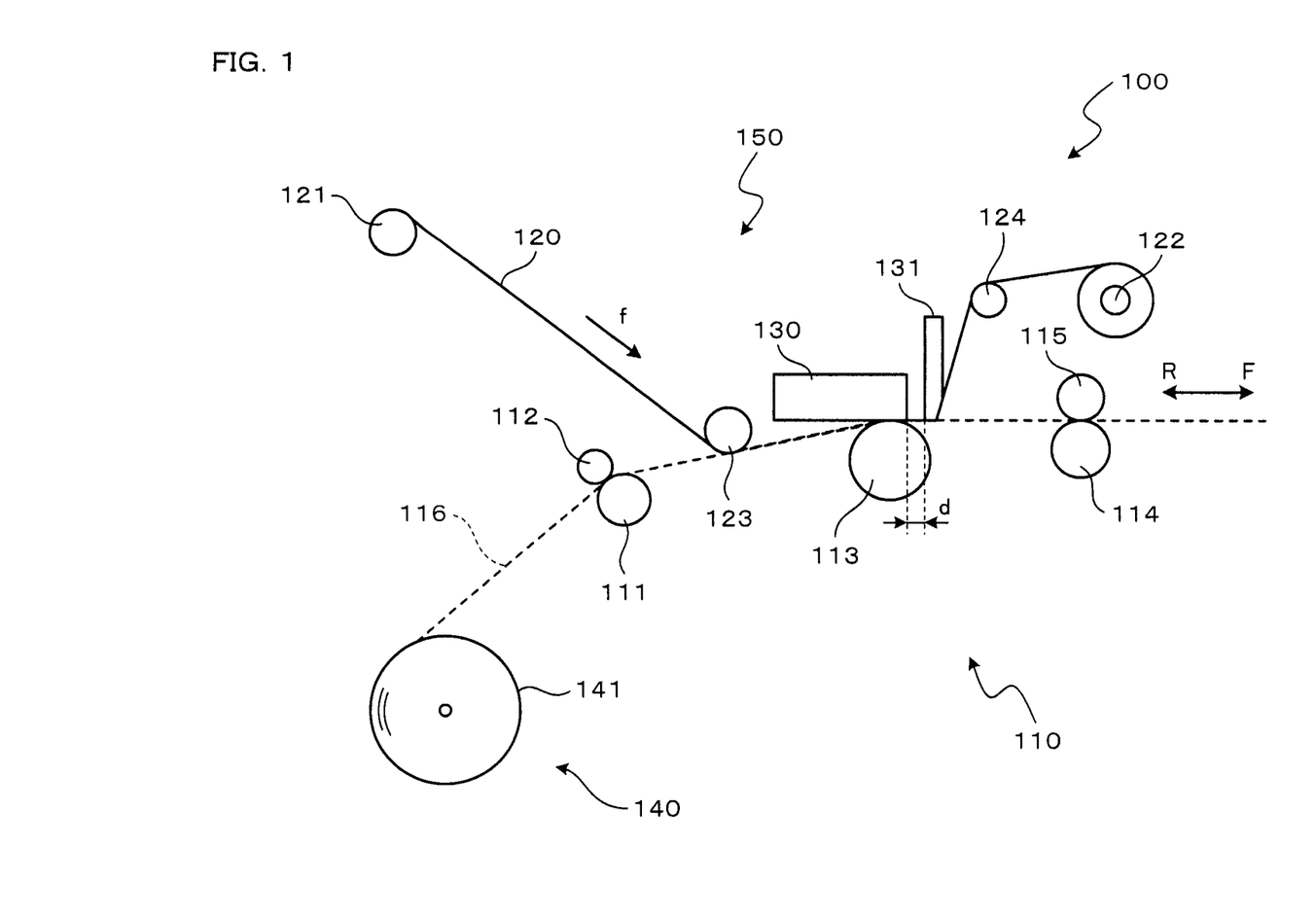
FIG. 1 shows a general construction of a thermal transfer printer according to a first embodiment of the present invention.

Hereinafter, preferred embodiments of the present invention will be described with reference to the drawings. As shown in FIG. 1, a thermal transfer printer 100 according to a first embodiment of the present invention includes a paper holder 140, a paper conveyance mechanism 110, an ink ribbon conveyance mechanism 150, and a thermal head 130. The thermal transfer printer 100 is connected with a host computer (not shown), and performs image recording on the basis of image data sent from the host computer.

The paper holder 140 can hold a rolled long paper 141. The paper 141 held by the paper holder 140 is conveyed through a paper conveyance path 116 to the paper conveyance mechanism 110.

The paper conveyance mechanism 110 includes, in the order from the upstream of the paper conveyance path 116, a feed roller 111 and a pinch roller 112; a platen roller 113 disposed so as to be opposed to the thermal head 130; and a discharge roller 114 and a pinch roller 115. The paper 141 taken out from the paper holder 140 into the paper conveyance path 116 is pinched by the feed roller 111 and the pinch roller 112; passes between the thermal head 130 and the platen roller 113; and is pinched by the discharge roller 114 and the pinch roller 115. The paper 141 thus conveyed is properly cut by a not-shown cutter disposed further downstream. The feed roller 111, the platen roller 113, and the discharge roller 114 are driven to rotate by a paper conveyance motor 119 (see FIG. 3) such as a stepping motor. When the paper conveyance motor 119 drives the feed roller 111, the platen roller 113, and the discharge roller 114 to rotate clockwise, the paper 141 is conveyed in the direction of an arrow F. When the motor 119 drives the rollers to rotate counterclockwise, the paper 141 is conveyed in the direction of an arrow R.

The ink ribbon conveyance mechanism 150 includes a feed roller 121, guide rollers 123 and 124, and a take-up roller 122. Both end portions of an ink ribbon 120 are wound on the feed roller 121 and the take-up roller 122, respectively. The take-up roller 122 is driven to rotate by an ink ribbon conveyance motor 129 (see FIG. 3) such as a DC motor. When the take-up roller 122 is rotated clockwise, the ink ribbon 120 is conveyed in the direction of an arrow f with being taken up on the take-up roller 122.

Figure 2:
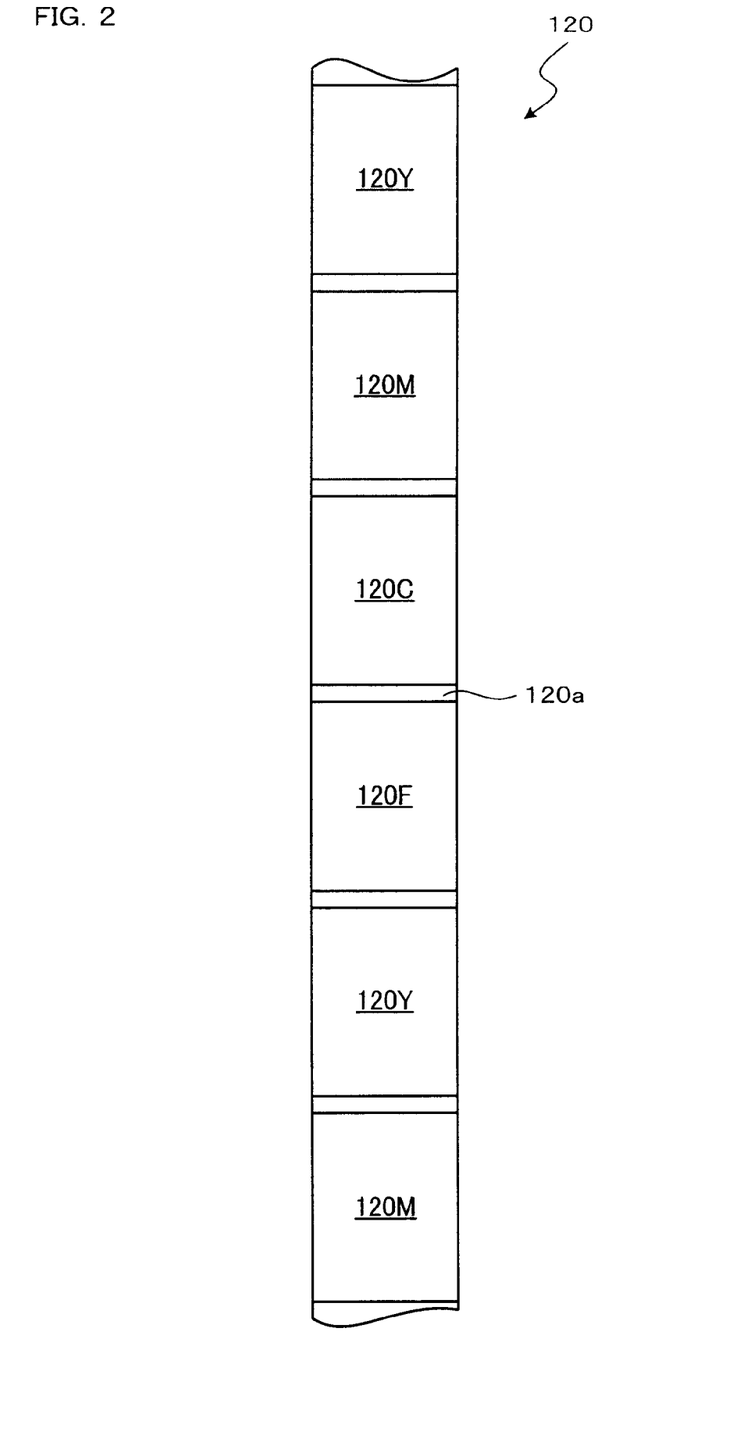
FIG. 2 shows a general construction of an ink ribbon.

As shown in FIG. 2, the ink ribbon 120 includes a long base film 120a; and dye layers 120Y, 120M, and 120C for colors of yellow, magenta, and cyan, and transparent films 120F for lamination, applied on the base film 120a. The dye layers 120Y, 120M, and 120C and the transparent films 120F are repeatedly arranged longitudinally of the base film 120a in that order. The dye layers 120Y, 120M, and 120C are made of dyes that sublimate by heat, so that gradation printing in which the printing levels are changed can be performed by temperature control of the thermal head 130. Thus, a high-quality color image is formed on the paper 141. In addition, as will be described later in detail, a transparent film 120F is transferred by heat of the thermal head 130 onto the paper 141 on which a color image has been formed, and thereby lamination is performed to protect the surface of the paper 141 from moisture and oil. The transmissivity of the transparent film 120F may be various.

The thermal head 130 includes a substrate (not shown) and a plurality of heating elements (not shown) disposed on the substrate. The thermal head 130 is vertically moved by a head drive motor 139 (see FIG. 3) to be pressed onto and separated from the platen roller 113. In an image formation region between the thermal head 130 and the platen roller 113, each color dye of the ink ribbon 120 is transferred onto the paper 141 to form a color image.

On the downstream side of the thermal head 130 in the direction F, a peeling plate 131 is provided to peel off the ink ribbon 120 from the paper 141. The peeling plate 131 comes into contact with the upper surface of the ink ribbon 120 from which dyes have been transferred onto the paper 141 by the thermal head 130. The peeling plate 131 then separates the ink ribbon 120 from the paper conveyance path 116.

Figure 3:
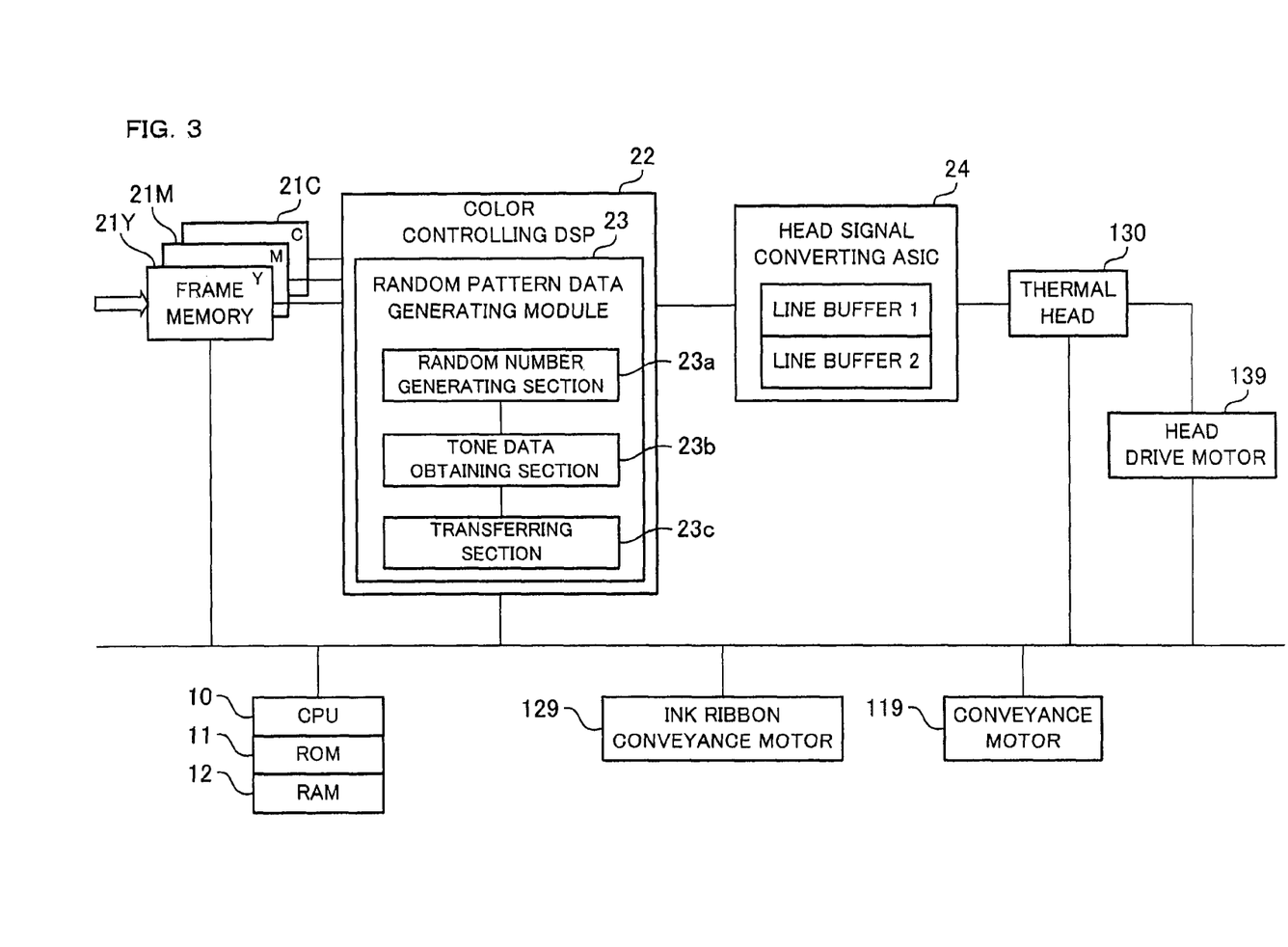
FIG. 3 is a block diagram showing an electrical constitution of the thermal transfer printer.

Next, an electrical constitution of the thermal transfer printer 100 will be described with reference to FIG. 3. As shown in FIG. 3, the thermal transfer printer 100 includes frame memories 21Y, 21M, and 21C; a color controlling DSP (digital signal processor) 22; a head signal converting ASIC (application specific integrated circuit) 24; a CPU (central processing unit) 10 for controlling the operation of each part of the thermal transfer printer 100; a ROM (read only memory) 11 storing therein a control program to be executed by the CPU 10 and data to be used in the control program; and a RAM (random access memory) 12 for temporally storing data in execution of the program.

The frame memories 21Y, 21M, and 21C store image data of one frame for the respective colors of yellow, magenta, and cyan, sent from the host computer. Under the control of the CPU 10, the color controlling DSP 22 performs control such as correction for data of each color of yellow, magenta, and cyan, sent from the frame memories 21Y, 21M, and 21C. The color controlling DSP 22 includes a random pattern data generating module 23 that generates random pattern data to be used for transfer of a transparent film 120F. The random pattern data generating module 23 includes a random number generating section 23a, a tone data obtaining section 23b, and a transferring section 23c. The functions of those sections 23a, 23b, and 23c will be described later in detail with reference to the flow of FIG. 4. The head signal converting ASIC 24 has therein buffers for two lines, and data for two lines transferred from the color controlling DSP 22 are written in respective line buffers 1 and 2. The CPU 10 reads out the data written in the line buffers 1 and 2. In addition, by referring to a head voltage table stored in the ROM 11, the CPU 10 sets a voltage to be supplied to a heat sensitive element of the thermal head 130. Further, the CPU 10 controls the head signal converting ASIC 24 so that the voltage data is supplied to the thermal head 130 at a predetermined timing. On the basis of the voltage data thus supplied, the thermal head 130 transfers onto the paper 141 each of the dye layers 120Y, 120M, and 120C on the ink ribbon 120 to form a color image. Afterward, the thermal head 130 further transfers a transparent film 120F onto the paper 141 on which the color image has been formed, to perform lamination.

Figure 4:
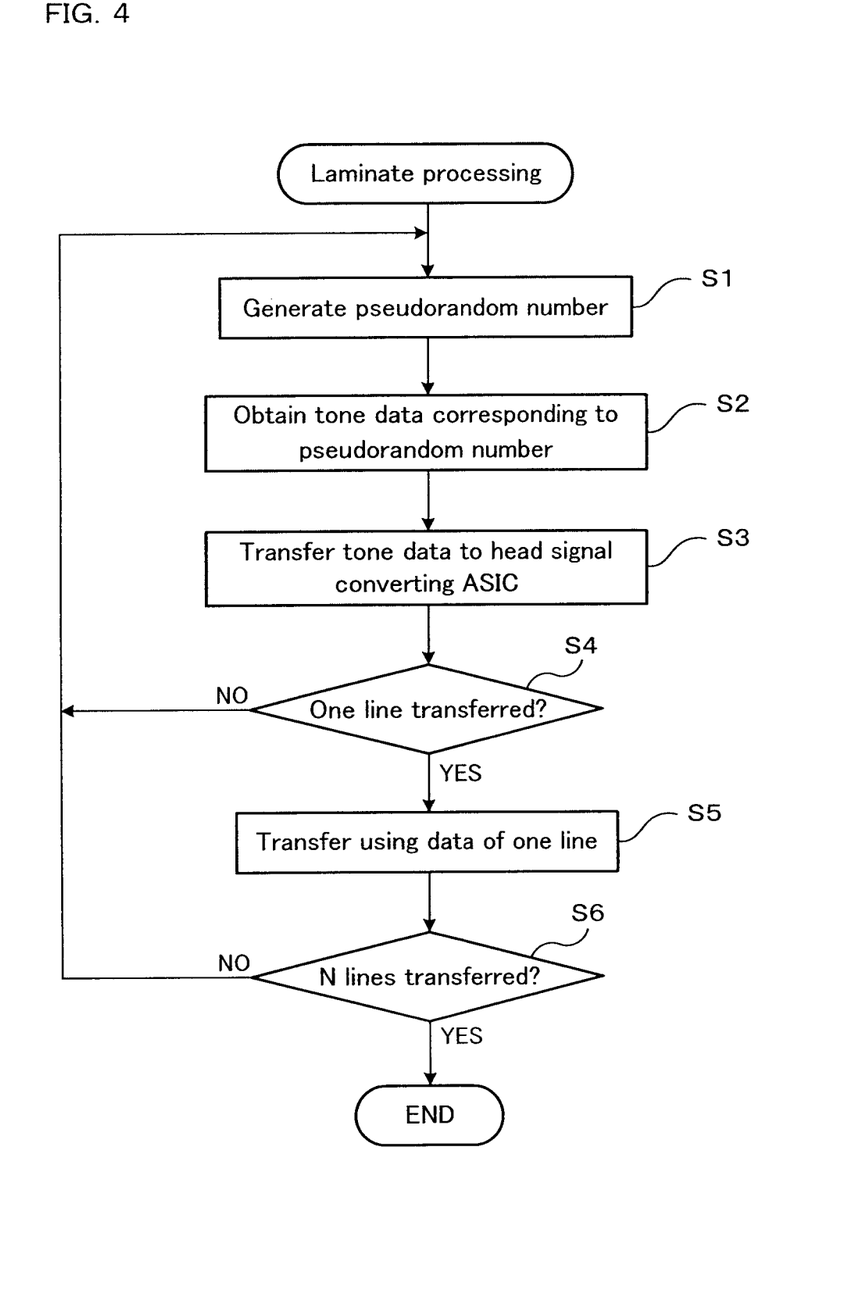
FIG. 4 is a flowchart of laminate processing.

Next, laminate processing will be described with reference to FIG. 4. The following process is performed under the control of the CPU 10.

First, the random number generating section 23a of the random pattern data generating module 23 generates a pseudorandom number (S1). By referring to a corresponding table stored in the ROM 11, the tone data obtaining section 23b obtains tone data corresponding to the pseudorandom number generated in S1 (S2). Afterward, the transferring section 23c transfers to the head signal converting ASIC 24 the tone data obtained in S2 (S3).

In this embodiment, the tone data is constituted by four values of "0", "1", "2", and "3", one of which is determined for each dot. In the order of "0", "1", "2", and "3", the voltage increases that is to be supplied to the heat sensitive element of the thermal head 130, so as to increase the thickness of the transparent film 120F to be transferred. The processes of S1 to S3 are performed for each dot, and tone data of each dot of one line is sequentially written in one of the line buffers 1 and 2.

After S3, it is judged whether or not tone data of one line has been transferred to the head signal converting ASIC 24 (S4). When the tone data of one line has not yet been transferred (S4: NO), the flow returns to S1 to repeat the processes of S1 to S3 till the tone data of one line is transferred. When the tone data of one line has been transferred (S4: YES), a transparent film 120F is transferred by using the tone data written in one of the line buffers 1 and 2 in which the tone data was transferred in S1 to S3 (S5).

It is then judged whether or not transfer of N lines corresponding to the whole surface of the paper 141 is completed (S6). When the transfer of N lines is not yet completed (S6: NO), the flow returns to S1. In the subsequent processes of S1 to S5, the line buffer to be used is changed; tone data is transferred to the other line buffer; and a transparent film 120F is transferred by using the data. When the transfer of N lines is completed (S6: YES), this laminate process is ended.

As described above, in the thermal transfer printer 100 of this embodiment, the data concerning the transfer pattern of a transparent film 120F is not externally sent and stored in a memory but generated in the random pattern data generating module 23. Therefore, there is no necessity of providing a dedicated memory for storing the data, which is advantageous in cost.

Because the data for not the whole but only a part of the surface of the paper 141 (data of one line in this embodiment) is repeatedly generated, the generating process of the transfer pattern data can be simplified and the time for the process can be shortened.

In addition, because data of one line is repeatedly generated, two line buffers provided in the head signal converting ASIC 24, which are used in image formation by each color of yellow, magenta, and cyan, can be used for lamination. There is no necessity of adding a new component, and therefore the construction can be simplified.

Because the color controlling DSP 22 to be used in image formation by each color of yellow, magenta, and cyan includes the random pattern data generating module 23, and therefore the color controlling DSP 22 can be used in lamination, there is no necessity of adding a new component.

The image forming apparatus of this embodiment is the thermal transfer printer 100 having the thermal head 130. The problem that a dedicated memory must be provided for storing pattern data for transparent film lamination is particularly remarkable in such a thermal transfer type image forming apparatus. In this embodiment, therefore, because the problem is dissolved, a more practical effect is obtained.

Figure 5:
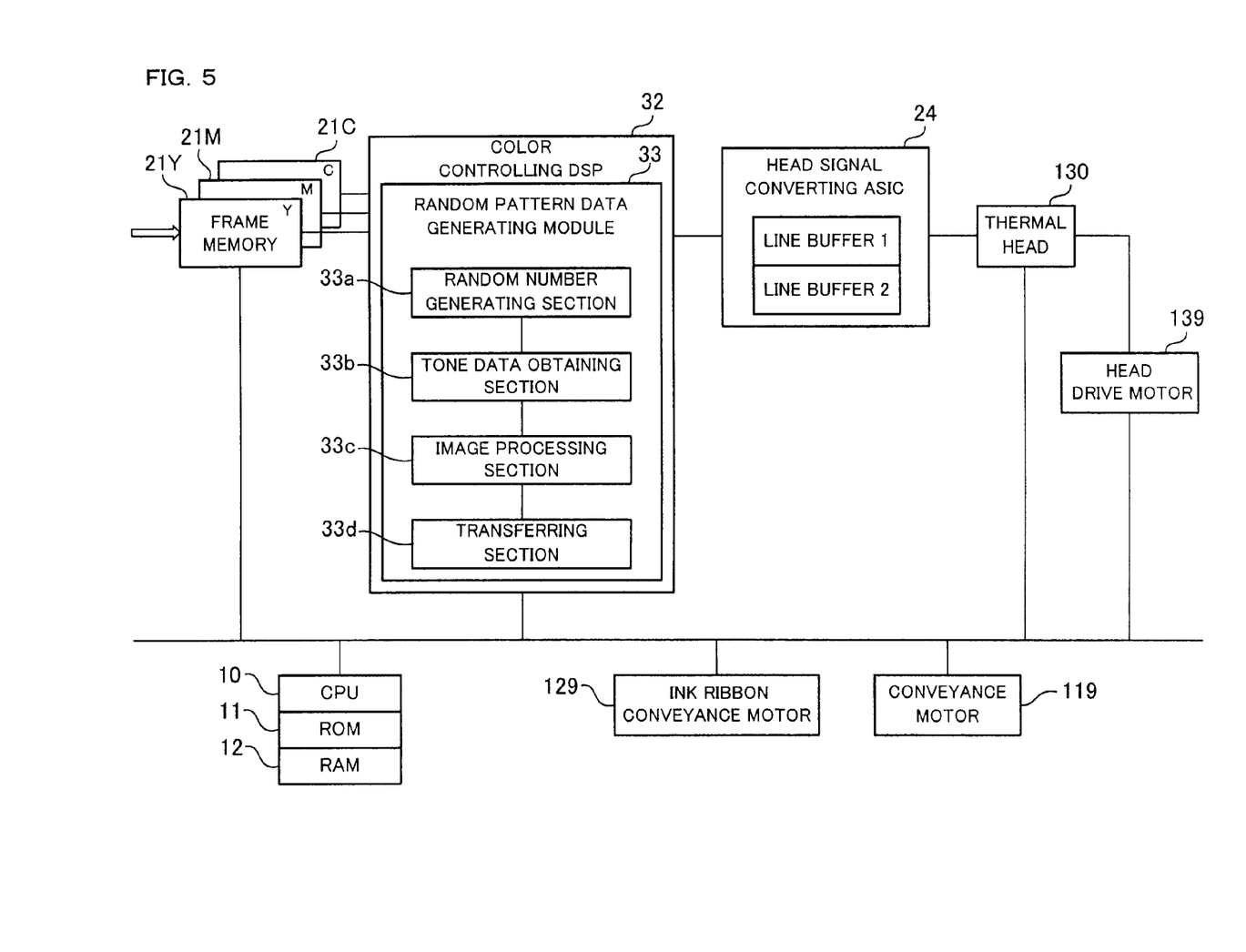
FIG. 5 is a block diagram showing an electrical constitution of a thermal transfer printer according to a second embodiment of the present invention.

A second embodiment of the present invention will be described. First, an electrical constitution of a thermal transfer printer 100 will be described with reference to FIG. 5. In this embodiment, the same components as in FIG. 3 are denoted by the same reference numerals as in FIG. 3, respectively, and the description thereof will be omitted. As shown in FIG. 5, a color controlling DSP 32 includes a random pattern data generating module 33 that generates random pattern data to be used for transfer of a transparent film 120F. The random pattern data generating module 33 includes a random number generating section 33a, a tone data obtaining section 33b, an image processing section 33c, and a transferring section 33d. The functions of those sections 33a, 33b, 33c, and 33d will be described later in detail with reference to the flowchart of FIG. 6.

Figure 6:
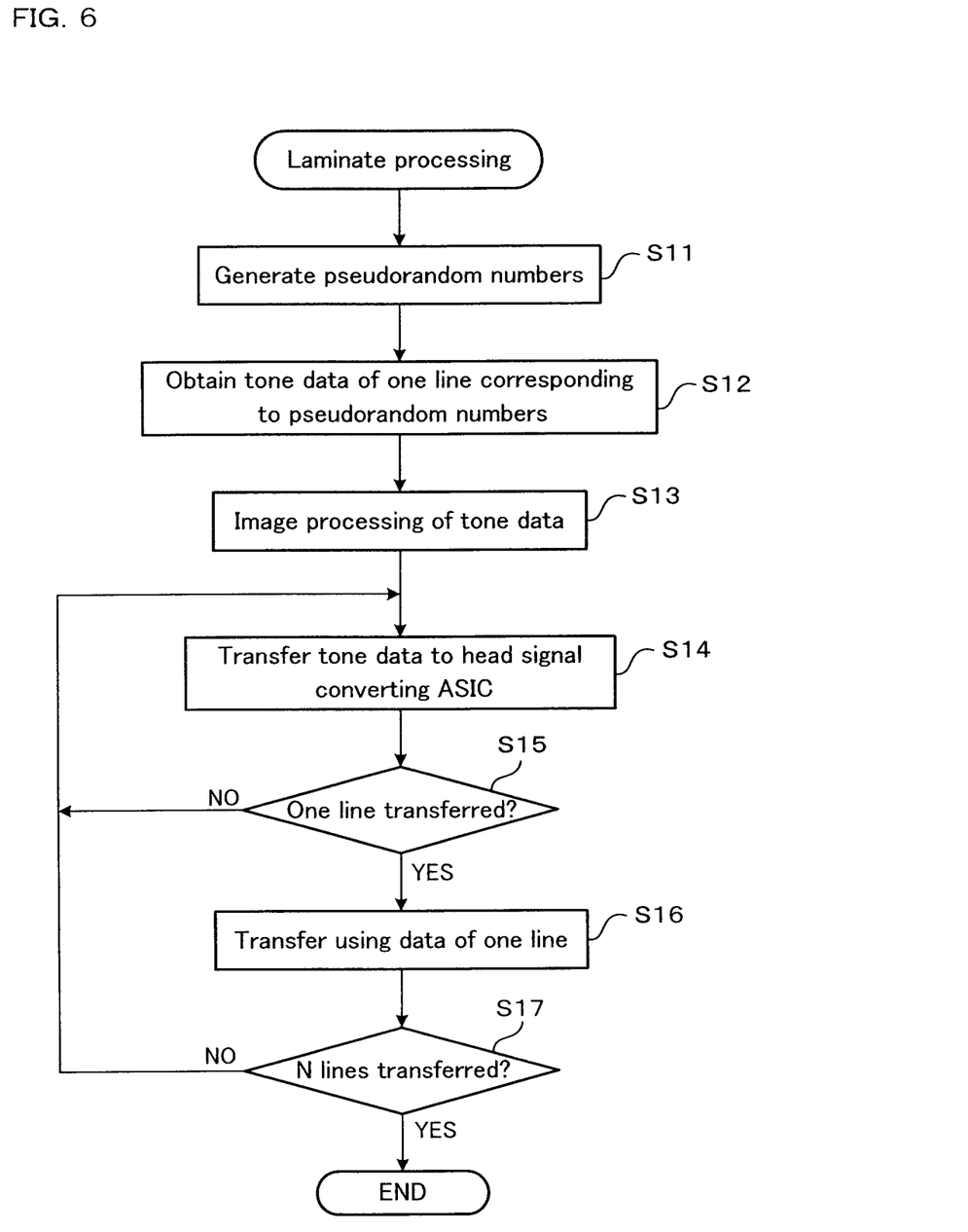
FIG. 6 is a flowchart of laminate processing according to the second embodiment of the present invention.

Next, laminate processing will be described with reference to FIG. 6. The following process is performed under the control of the CPU 10.

First, the random number generating section 33a of the random pattern data generating module 33 generates the same number of pseudorandom numbers as the number of pixels of one frame (S11). By referring to a corresponding table stored in the ROM 11, the tone data obtaining section 33b obtains tone data corresponding to the pseudorandom numbers generated in S11 (S12).

Further, the image processing section 33c applies image processing to the tone data of one frame obtained in S12 (S13). As image processing in this step, any of various known image processes, such as embossment and edge enhancement, may be performed. Afterward, the transferring section 33d transfers to the head signal converting ASIC 24 tone data of one pixel to which image processing was applied in S13 (S14). The tone data of one pixel transferred to the head signal converting ASIC 24 is written in one of two line buffers (the line buffers 1 and 2). When the one line buffer becomes full, the subsequent tone data is written in the other line buffer. Thus, the tone data is alternately written in the two line buffers.

After S14, it is judged whether or not tone data of one line has been transferred to the head signal converting ASIC 24 (S15). When the tone data of one line has not yet been transferred (S15: NO), the flow returns to S14 to repeat the process of S14 till the tone data of one line is transferred. When the tone data of one line has been transferred (S15: YES), a transparent film 120F is transferred by using the tone data written in one of the line buffers 1 and 2 in which the tone data was transferred in S14 (S16).

It is then judged whether or not transfer of N lines corresponding to the whole surface of the paper 141 is completed (S17). When the transfer of N lines is not yet completed (S17: NO), the flow returns to S14. In S14, the line buffer for storing data is changed; tone data is transferred to the other line buffer; and a transparent film 120F is transferred by using the data. When the transfer of N lines is completed (S17: YES), this laminate process is ended.

Also in this embodiment, like the first embodiment, the data concerning the transfer pattern of a transparent film 120F is not externally sent and stored in a memory but generated in the random pattern data generating module 33. Therefore, there is no necessity of providing a dedicated memory for storing the data, which is advantageous in cost.

In addition, because the color controlling DSP 32 to be used in image formation by each color of yellow, magenta, and cyan includes the random pattern data generating module 33, and therefore the color controlling DSP 32 can be used in lamination, there is no necessity of adding a new component.

Further, the tone data generated in the random pattern data generating module 33 is processed with embossment or edge enhancement by the image processing section 33c. Therefore, a wide variety of matte prints can be realized. When the tone data is random pattern data as in this embodiment, the change in the unevenness of the random pattern can be made smooth; or a matte print having a three-dimensional appearance (a feeling of roughness) can be made by enhancing the difference in the unevenness.

The above-described embodiments can be variously changed in design. For example, in the above-described embodiments, the thermal transfer printer 100 records an image in accordance with image data sent from a host computer (not shown). However, the present invention is not limited to that. For example, the thermal transfer printer 100 may record an image in accordance with image data read out from a memory card via a memory card interface.

In the above-described embodiments, a random pattern is used for the transfer pattern of a transparent film 120F. However, not such a random pattern but a pattern may be used in which unevenness is regularly formed at regular intervals (for example, a checkered pattern). On the other hand, a transparent film 120F may be transferred not in an uneven pattern but in a uniform thickness. In this case, fixed tone data may be used. Further, lamination may be performed not over the whole surface but only part of the surface of the paper 141.

The thermal transfer printer 100 may have an operation panel operable by an operator so that a transfer pattern of a transparent film 120F is determined in accordance with an input through the operation panel.

In the above-described embodiments, the random pattern data generating module 23 repeatedly generates data of one line. However, the present invention is not limited to that. The random pattern data generating module 23 may generate data for the whole surface, a half surface, or the like, of the paper 141. On the other hand, generated data may be repeatedly used.

In the above-described embodiments, the color controlling DSP 22 includes the random pattern data generating module 23. However, the present invention is not limited to that. In addition, the electrical constitution shown in FIG. 3 is by way of example, and it can be variously changed.

Image formation apparatuses according to the present invention are never limited to thermal transfer printers, and also applicable to inkjet printers and so on. In addition, the present invention is not limited to such printers, and also applicable to facsimiles, copying machines, and so on. Further, the paper is not limited to a wound long paper, and cut papers cut in advance into a predetermined length may be used.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image forming apparatus comprising:
   a conveyance mechanism that conveys a recording medium;
   a recording head that records an image in accordance with image data onto the recording medium being conveyed by the conveyance mechanism, and transfers a transparent film on the recording medium onto which the image has been recorded;
   a data generating unit that internally generates random pattern data by itself for use when transferring the transparent film onto the recording medium and including a color controlling unit that controls colors of the image to be recorded on the recording medium; and
   a controller that controls the recording head so that the colors of the image are recorded on the recording medium and the transparent film is transferred on the basis of the random pattern data that are input from the data generating unit as generated by the data generating unit,
   wherein the data generating unit repeatedly generates data concerning a partial transfer pattern of the transparent film to be transferred onto the whole surface of the recording medium, and the data that is repeatedly generated is transmitted to the controller each time the data is repeatedly generated,
   wherein the data generating unit includes an image processing section that applies image processing to the random pattern data, and
   wherein the image processing is any one or a combination of embossment, edge enhancement, MTF filter, and unsharp mask.

2. The image forming apparatus according to claim 1, wherein the data generating unit repeatedly generates random pattern data of one line.

3. The image forming apparatus according to claim 1, wherein the recording head is a thermal head that transfers inks carried on a ink ribbon to record an image on the recording medium, and transfers a transparent film carried on the ink ribbon subsequently to the inks onto the recording medium on which the image has been formed with the inks.

4. An image forming method in which an image is recorded on a recording medium in accordance with image data and a transparent film is transferred onto the recording medium on which the image has been recorded, the method comprising steps of:
   a data generating step of controlling colors of the image to be recorded on the recording medium and internally generating random pattern data in a data generating unit by itself for use when transferring the transparent film onto the recording medium; and
   a controlling step of controlling, by a processor, a recording head so that the colors of the image are recorded on the recording medium and the transparent film is transferred onto the recording medium on the basis of the random pattern data that are input from the data generating step as generated in the data generating step,
   wherein the data generating step repeatedly generates data concerning a partial transfer pattern of the transparent film to be transferred onto the whole surface of the recording medium, and the data that is repeatedly generated is transmitted to the processor each time the data is repeatedly generated,
   wherein the data generating step includes an image processing step that applies image processing to the random pattern data, and
   wherein the image processing is any one or a combination of embossment, edge enhancement, MTF filter, and unsharp mask.

5. The image forming method according to claim 4, wherein random pattern data for use in transferring a part of the transparent film to be transferred onto the whole surface of the recording medium is repeatedly generated in the data generating step.

6. The image forming method according to claim 5, wherein random pattern data of one line is repeatedly generated in the data generating step.

* * * * *